United States Patent [19]
Zeitler

[11] Patent Number: 5,944,397
[45] Date of Patent: Aug. 31, 1999

[54] MULTI-DOOR ELECTRICAL EQUIPMENT ENCLOSURE WITH MECHANICAL DOOR INTERLOCK

[75] Inventor: Ronald F. Zeitler, Saginaw, Mich.

[73] Assignee: Saginaw Control & Engineering, Inc., Saginaw, Mich.

[21] Appl. No.: 08/951,265

[22] Filed: Oct. 16, 1997

[51] Int. Cl.[6] .................................................. E06B 65/46
[52] U.S. Cl. ........................................ 312/220; 312/217
[58] Field of Search ................................. 312/215, 216, 312/220

[56] References Cited

U.S. PATENT DOCUMENTS

| 341,746 | 5/1886 | Hall ........................................ 312/220 |
| 1,139,939 | 5/1915 | Westmoreland ........................ 312/220 |
| 2,543,643 | 2/1951 | Ryan et al. ............................. 312/220 |

FOREIGN PATENT DOCUMENTS

| 9706 | 9/1905 | United Kingdom ................... 312/220 |

*Primary Examiner*—Peter M. Cuomo
*Assistant Examiner*—Gerald A. Anderson
*Attorney, Agent, or Firm*—Reising, Ethington, Barnes, Kisselle, Learman & McCulloch, P.C.

[57] ABSTRACT

A multi-door enclosure for housing electrical equipment has a mechanical interlock device that interacts with a main primary door of the enclosure and the existing latch mechanisms of each of the remaining secondary doors to prevent such secondary doors from being opened unless the primary door is first opened. The interlock includes a lever arm that engages and is displaced by the primary door when closed. Such movement of the lever arm is transmitted via a mechanical linkage system to move one or more latch disabling members into disabling relation with the latch mechanisms of each of the secondary doors in order to retain the latch mechanisms in their latched positions and thereby lock the secondary doors in the closed position. Opening the secondary door allows the lever arm to return to its initial position which in turn retracts the latching members and allows unlatching and opening of the secondary doors.

12 Claims, 5 Drawing Sheets

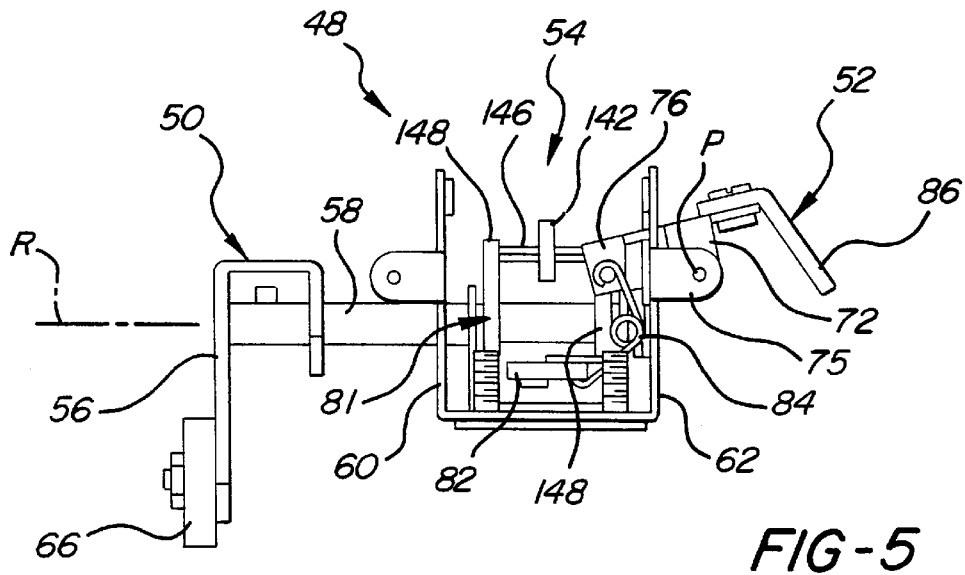
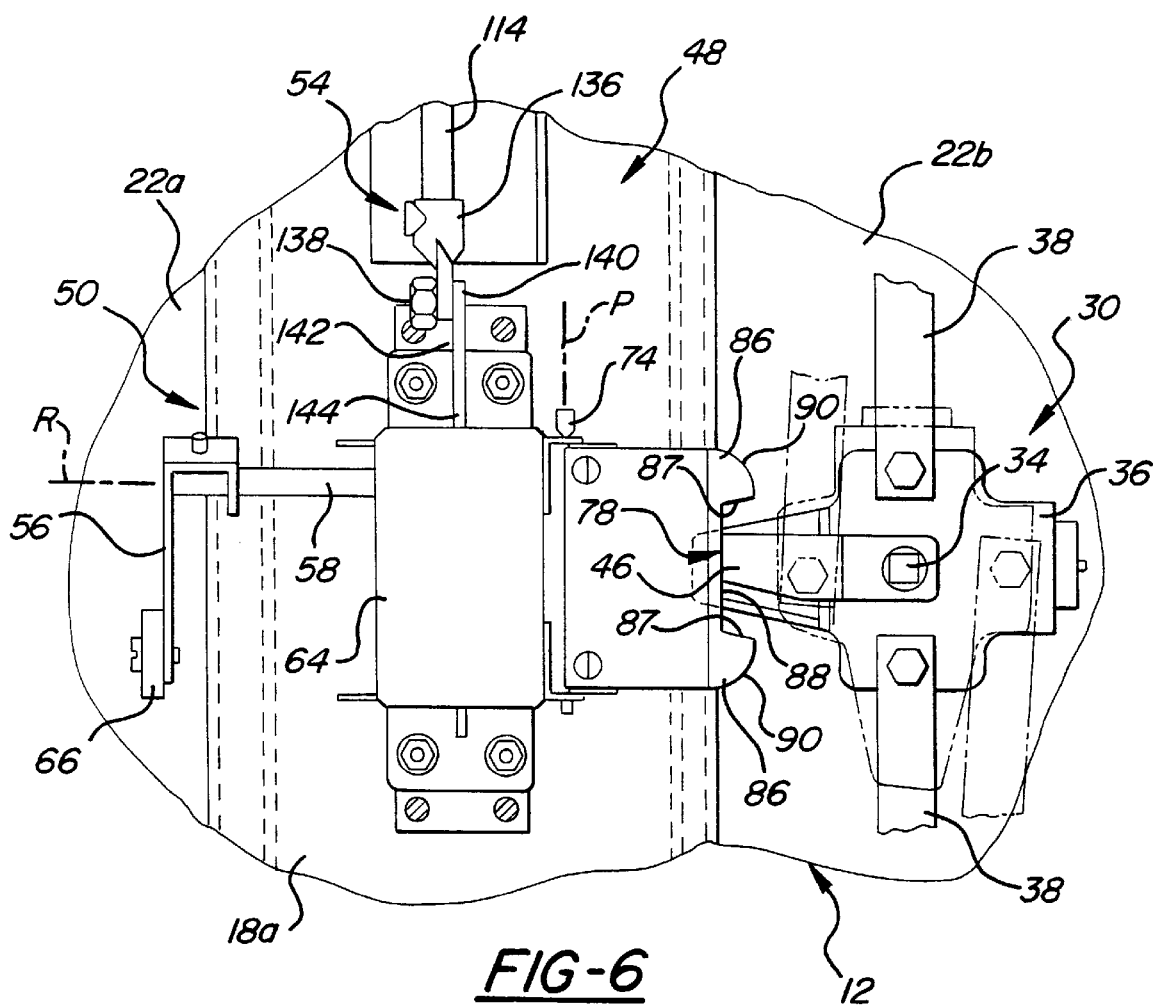

MULTI-DOOR ELECTRICAL EQUIPMENT ENCLOSURE WITH MECHANICAL DOOR INTERLOCK

This invention relates to multi-door enclosures of the type used to house electrical equipment.

BACKGROUND OF THE INVENTION

Enclosures are often used to house various electrical and electronic equipment such as controls, instruments, components, and the like in a wide range of different environments. The enclosures serve to limit access to the equipment as well as to protect the equipment against exposure to environmental contaminants such as dust, oil, water, and the like.

Typically, large-sized enclosures are provided with multi-hinged access doors that enable those working on the equipment to access various areas of the interior of the enclosure. The doors are fitted with the usual latch mechanisms that, when latched, secure the doors in a closed position and, when unlatched, permit the doors to be swung open. The main or "primary" access door is often tied to the control switch of the incoming power supply in such way that the primary door cannot be opened unless the power supply is switched "off".

Industry standards now also require that some means be in place to prevent the remaining "secondary" door or doors from being opened unless the primary door is first opened. In this way, none of the doors can be opened while the power is "on". This invention is directed to such a system for multi-door enclosures.

SUMMARY OF THE INVENTION

An enclosure for housing electrical equipment constructed according to the invention includes a cabinet having a primary access door and at least one secondary access door, each being hinged to the cabinet and movable between open and closed positions. At least the secondary door is provided with a latch mechanism that, when latched, operates to secure the secondary door in the closed position. A mechanical interlock acts between the primary door and the latch of the secondary door and is operative in response to closing of the primary door to retain the latch mechanism in the latched position, thereby locking the secondary door in the closed position. The interlock is operative in response to opening of the primary door to enable movement of the latch mechanism to the unlocked position thereby permitting the secondary door to be opened.

The invention provides a simple, mechanical solution to controlling the opening of the secondary door or doors of a multi-door enclosure. By retaining the latch mechanism in the latched position when the primary door is closed, the interlock prevents the secondary door from being opened until such time as the primary door is first opened. One attempting to open the secondary door while the primary door is closed encounters, effectively, a locked door.

The mechanical interlock system may be incorporated as a feature of new enclosure constructions or can be readily retrofitted to existing enclosures to interact with their primary doors and secondary door latch mechanisms.

According to a preferred method of the invention for controlling the opening of such multi-door enclosures having at least one such secondary door, a mechanical interlock is provided having a movable actuator supported in position to confront and be displaced by the primary door as it is closed. The actuator is coupled by a mechanical linkage to a latch disabling member supported adjacent the latch mechanism of the secondary door and responsive to such displacement of the actuator to move into disabling relation with the latch mechanism of the secondary door so as retain the latch mechanism in the latched position and prevent the secondary door from being opened while the primary door is closed.

THE DRAWINGS

A presently preferred embodiment of the invention is disclosed in the following description and in the accompanying drawings, wherein:

FIG. 3 is an enlarged front view of a component of the mechanical interlock device with the front cover removed;

FIG. 4 is an enlarged side elevation view of the device shown in FIG. 3, but with the front cover in place;

FIG. 5 is an enlarged bottom view of the device of FIG. 3, but with the front cover in place;

FIG. 6 is a view like FIG. 3, but showing the interlock installed and interacting with the primary door and the latch mechanism of the secondary door;

Figure 9:
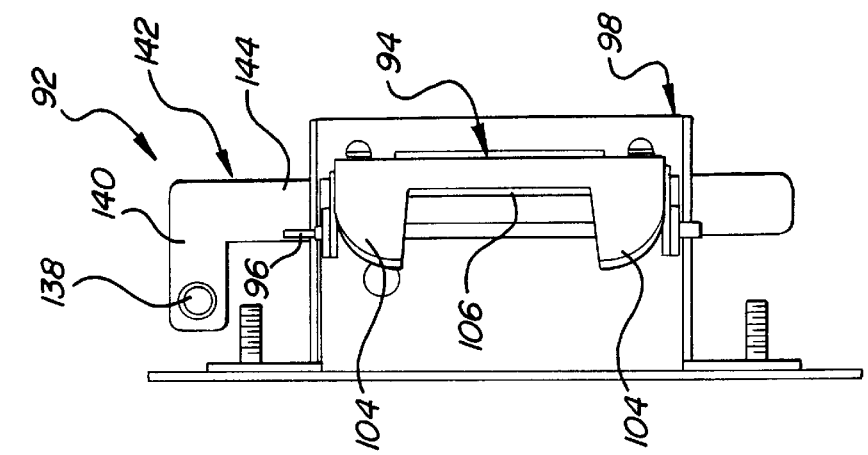
Figure 8:
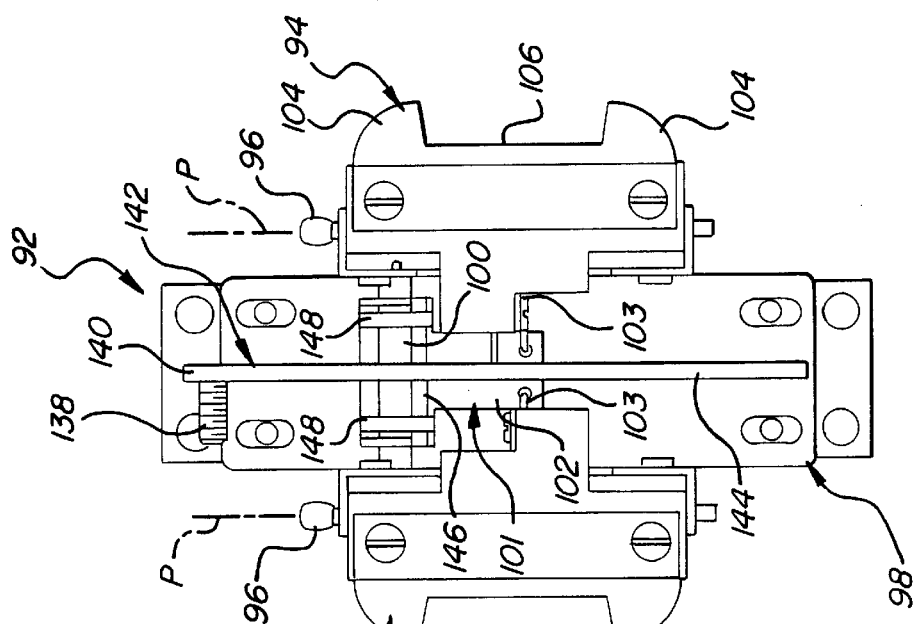
Figure 10:
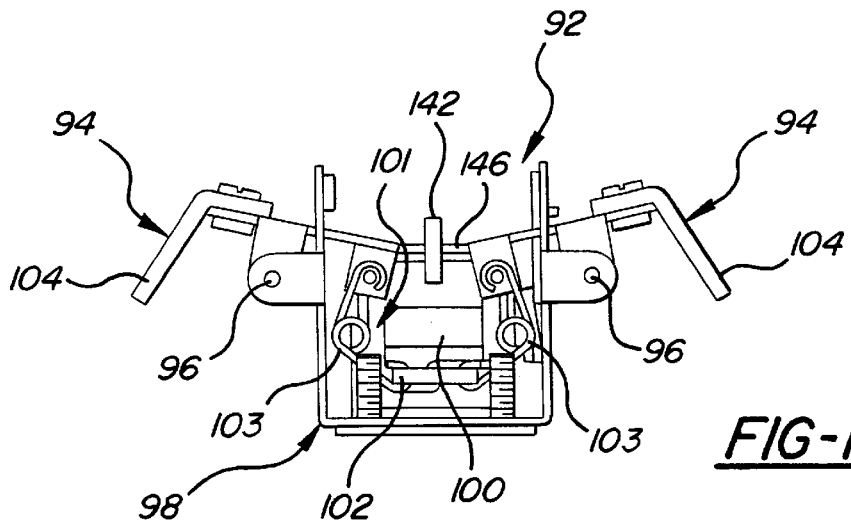
Figure 11:
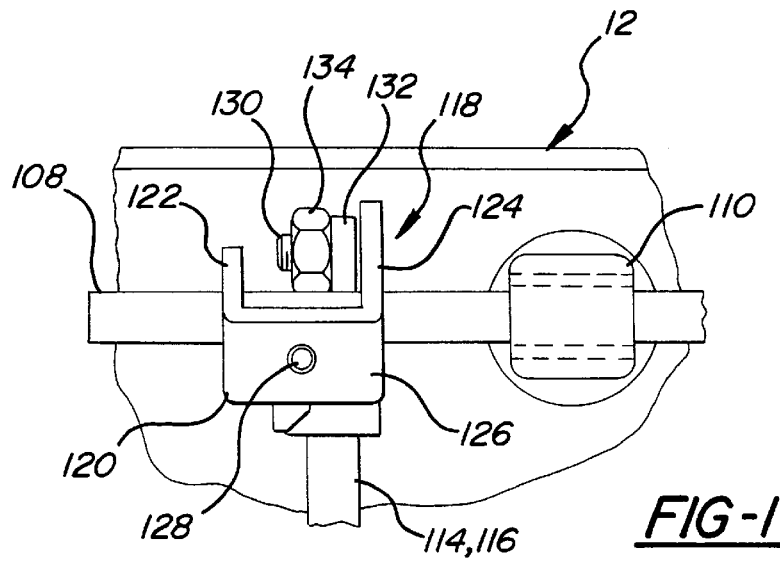
Figure 12:
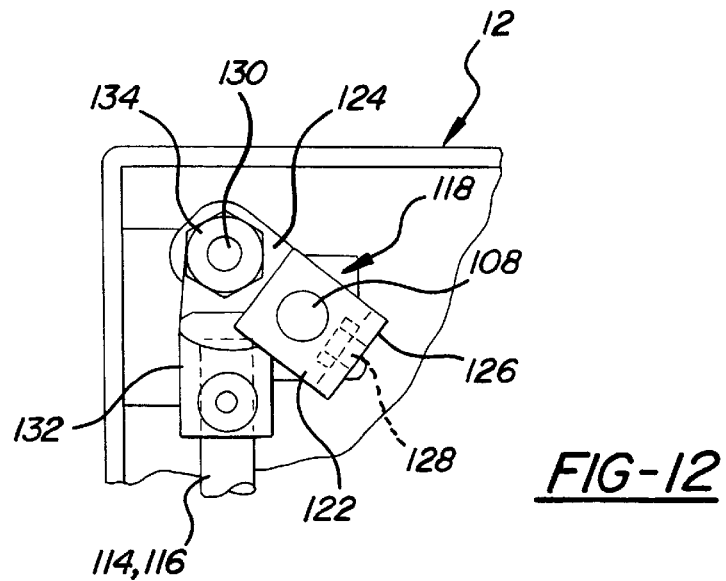

FIGS. 8, 9, and 10 are views corresponding, respectively, to FIGS. 3, 4, and 5, but of a double latch component of the interlock device; and FIGS. 11 and 12 are enlarged fragmentary front and side views of a portion of the mechanical linkage of the interlock.

DETAILED DESCRIPTION

A multi-door enclosure constructed according to the invention is designated generally at 10 in the drawings and comprises a cabinet 12 of generally rectangular box construction whose walls 14 enclose an interior space 16 within the cabinet 12 for the accommodation of electrical equipment, such as electrical or electronic controls, instruments, components, and the like (not shown).

The cabinet 12 has a front wall frame 18 with a plurality of door openings 20 in each of which is hung a door hinged along one vertical edge thereof to the adjacent vertical frame member portion of the cabinet 12 for movement between open and closed positions. Door 22a, to the right in FIG. 1 and to the left in FIG. 2, is designated the "primary" access door, while the remaining doors 22b are designated "secondary" doors by convention. As will become apparent from the ensuing description, the invention contemplates enclosures having a primary access door 22a and at least one such secondary access door 22b. In the embodiment shown in the drawings, there are three such secondary access doors 22b.

Referring to the interior elevation view of the enclosure 10 of FIG. 2, it will be seen that the primary access door 22a is hinged at 24 on the first vertical frame portion 18a, whereas the next two successive secondary doors 22b are hinged at 26 to a common second vertical frame portion 18b. The remaining secondary door 22b to the far right is hinged at 28 to the end-most vertical frame portion 18d of the cabinet 12 such that the two doors 22b to the right have their unhinged swinging side bordering the third vertical frame portion 18c.

Figure 1:
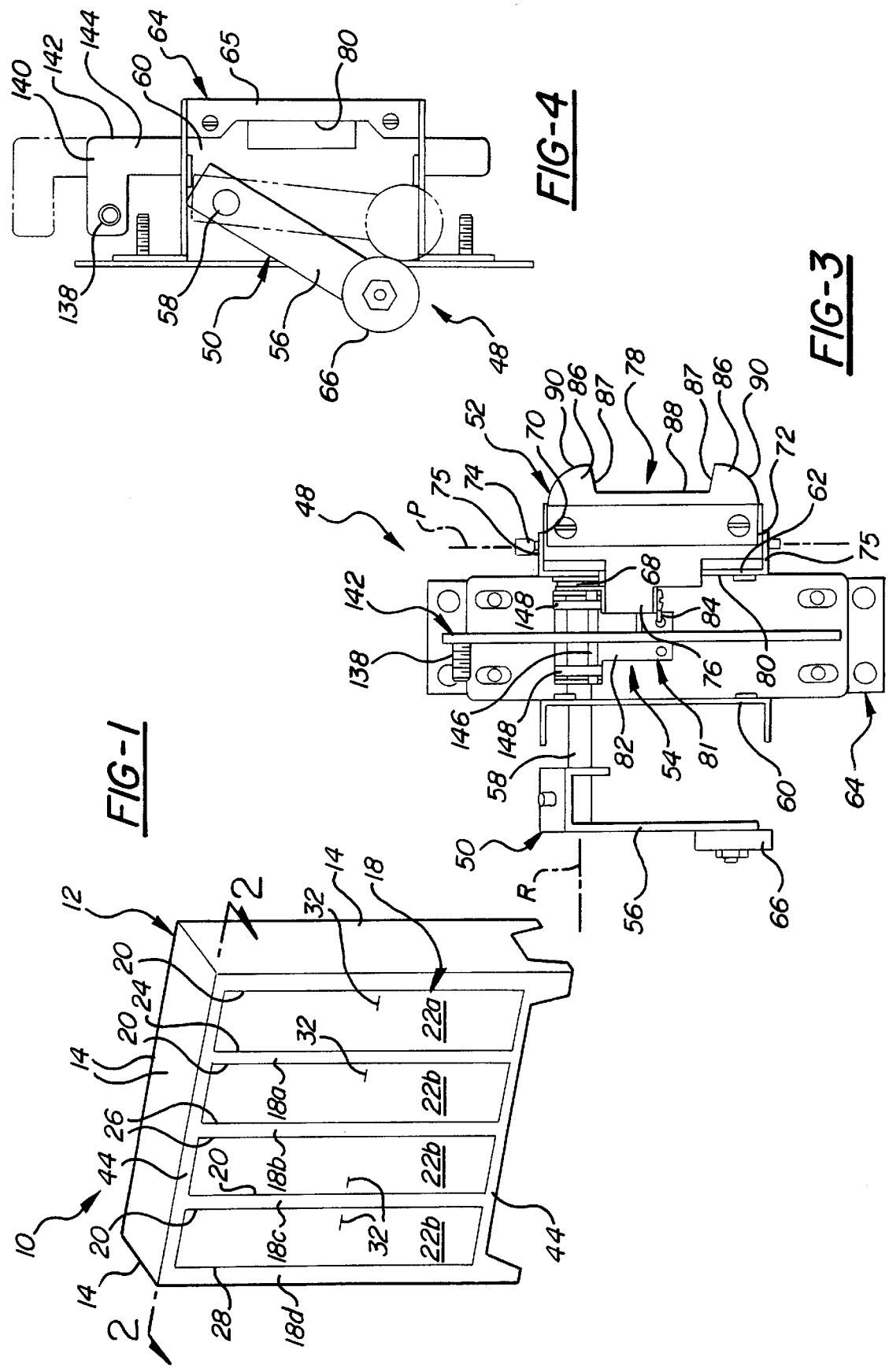
FIG. 1 is a front perspective view of a multi-door enclosure constructed according to the invention.
Figure 2:
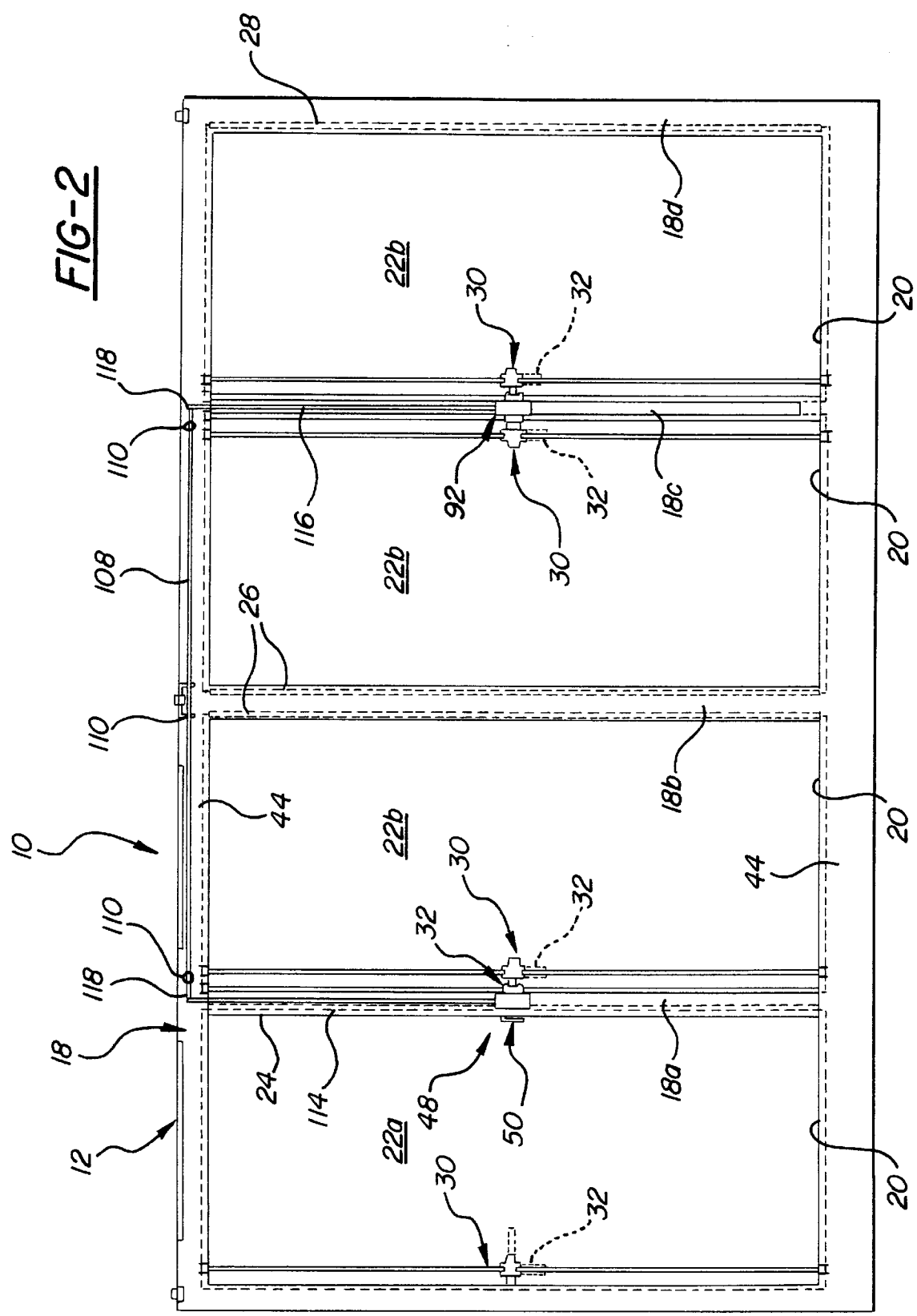
FIG. 2 is an inside elevational view of the enclosure taken generally along the lines 2—2 of FIG. 1.

Referring to FIGS. 1, 2, and 6, at least the secondary doors 22b, and preferably the primary doors 22a as well, are fitted with a latch mechanism 30 of conventional design that is movable between latched and unlatched positions. The latch mechanisms 30 for all of the doors are preferably of the same construction and operation. Each latch mechanism 30 has an exterior handle 32 mounted on a rotatable shaft 34 that extends through the associated door adjacent its swinging side. A turn plate 36 is fixed to the shaft 34 on the interior side of the door 22b and rotates with the shaft 34. A pair of latch rods 38 are pivoted to opposite sides of the turnplate 36 and extend generally vertically therefrom in opposite directions toward the top and bottom of the door. They carry rollers 40 at their free ends.

FIGS. 2 and 6 illustrate the latch mechanism in the latched and unlatched positions. In the latched position, the handle 32 is swung vertically downwardly, positioning a projection or tongue 46 of the turn plate 36 behind the associated adjacent vertical frame section 18a, 18c of the front frame 18 to secure the vertically midportion of the door 22. The free ends of the latch rods 38 are also positioned such that the rollers 40 extend beyond the top and bottom margins of the door and engage the adjacent horizontal frame members 44 of the frame 18 to secure the top and bottom regions of the door in the closed position.

To unlatch a door, the handle 32 of the latch mechanism is swung to the horizontal position which in turn rotates the tongue 46 of the turn plate 36 out of latching engagement with its associated vertical frame section and retracts the latch rods 38 and their rollers 40 to the broken chain line position shown in FIG. 6 out of latching engagement with the front frame 18, thereby permitting the door to be opened.

The description and features of the closure described thus far, including the multiple hinged doors and the latch mechanisms 30 are conventional.

According to the invention, a mechanical interlock device or system 48 is provided which interacts with the primary door 22a and the latch mechanism 30 of each of the secondary doors 22b in such manner as to disable such latch mechanisms 30 by retaining them in their latched positions while the primary door 22a is closed. In this way, the interlock device 48 assures that the secondary doors 22b cannot be opened unless the primary door 22a is first opened.

The interlock 48 includes an actuator 50 supported adjacent the primary door 22a in position to engage and be displaced by the main door 22a in response to closing the primary door. Referring to FIGS. 3–6, the actuator 50 includes a lever arm 56 mounted on an actuator shaft 58 journaled by the opposed sidewalls 60, 62 of an actuator housing 64 adjacent the hinged side of the primary door 22a for rotation about a generally horizontal rotation axis R. The arm 56 carries a door-engaging roller 66 at its free end in spaced relation to the rotation axis R. A torsion spring 68 (FIG. 3) acts between the housing 64 and shaft 58 to urge the roller 66 of the lever arm 56 constantly outwardly into the path of the primary door 22a. As the primary door 22a is swung closed, it confronts the roller 66 and pivots the lever arm 56 inwardly against the force of the spring 68, causing the shaft 58 in turn to rotate. A front cover 65 of the housing 64 extends across the side walls 60, 62 to protect the internal workings, but is shown removed in FIG. 3.

Supported adjacent each latch mechanism 30 of the secondary doors 22b is a latch disabling member 52 that is movable into and out of disabling relation or position with respect to the associated latch mechanism 30. In the illustrated embodiment, the secondary door 22b nearest the primary door 22a (i.e., the second door to the right in FIG. 2) is mounted with its swinging side adjacent the vertical frame portion 18a on which the primary door 22a is hinged. With this door arrangement, it is convenient to mount the latch disabling member 52 for that door on the actuator housing 64.

The latch disabling member 52 comprises a plate-like component that is pivoted between its ends to the actuator housing 64 by legs 70, 72 and hinge pin 74. It connects to legs 75 of the housing 64 for movement relative to the housing 64 about a vertical pivot axis P. The member 52 is operatively coupled, at one end 76 thereof, to the actuator shaft 58 by a mechanical linkage mechanism 54 and carries at its opposite end a catch 78 for interacting with the latch mechanism 30 of the associated secondary door 22b.

The coupled end 76 of the latch member 52 extends into the housing 64 through an opening 80 in the sidewall 62 thereof. The linkage 54 includes a bracket 81 that is fixed to the shaft 58 and has a leg portion 82 that extends radially from the shaft 58 to a free end adjacent to, but spaced from, the coupled end 76 of the latch member 52. A torsion spring 84 couples the end 76 of the latch member 52 to the free end of the leg 82, thereby providing a resilient connection between the latch member 52 and the actuator 50.

The catch 78 at the opposite end of the latch member 52 preferably comprises a pair of spaced ear projections 86 having opposing shoulders 87 defining a recess or detent 88 therebetween of sufficient width and depth to accommodate the tongue 46 of the secondary door latch mechanism 30 between the ears 86 when swung to the latched position. As shown best in FIGS. 3, 6, and 7, the ears 86 are rounded or tapered along their outer edges to provide camming surfaces 90.

Figure 7:
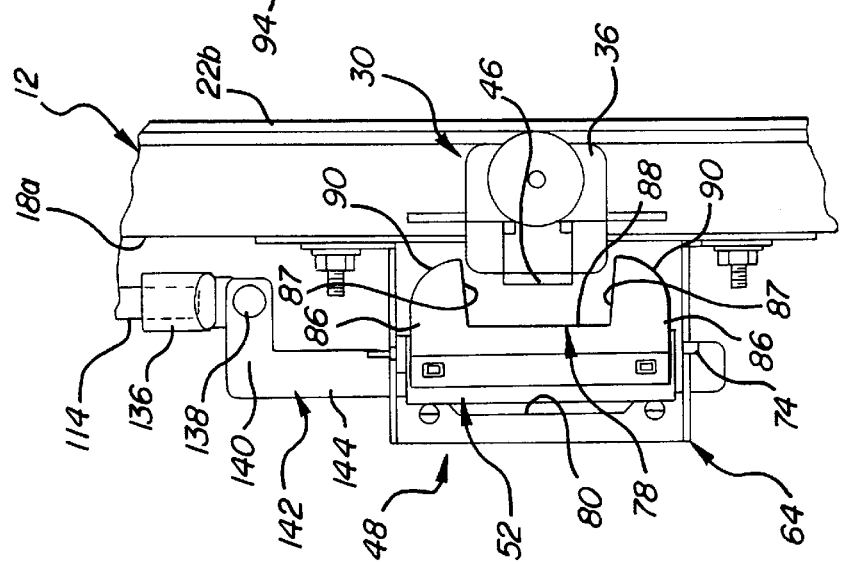
FIG. 7 is a side elevational view of FIG. 6.

In use, with the secondary door 22b closed and latched, subsequent closing of the primary door 22a displaces the lever arm 56 inwardly to the chain line position in FIG. 4, causing the actuator shaft 58 to rotate with the arm 56 in a counter-clockwise direction. Such rotation of the shaft 56 swings the leg portion 82 of the bracket 81 inwardly relative to the cabinet 12 and pivots the catch end 78 of the latch disabling member 52 outwardly via the torsion spring connection 84 into the path of the tongue 46 of the secondary door latch mechanism 30, trapping the tongue 46 within the detent 88 between the shoulders 87 of the ears 86, as shown in FIGS. 6 and 7. By so positioning the ears 86 that they interfere with the ability to move the tongue 46 beyond the shoulders 87, the interlock 48 operates to retain the latch mechanism 30 in the latched position thereby disabling the latch mechanism 30 and locking the secondary door 22b in the closed position. To the extent the tongue 46 is able to move within the detent 88, its range of movement is insufficient to enable the tongue 46 and latch rods 38 to be retracted out of locking relation with the front frame 18.

In order to open the secondary door 22b, it is necessary first to open the primary door 22a. Opening the primary door 22a allows the lever arm 56 to self-return outwardly by action of the associated torsion spring 68 to the solid line position of FIG. 4, which in turn rotates the shaft 55 clockwisely and pivots the catch end 78 of the latch disabling member inwardly to a position out of disabling relation with the secondary door latch mechanism 30, as illustrated in FIG. 5. When the latch member 52 is so positioned, normal operation of the secondary door latch mechanism 30 is permitted allowing the mechanism 30 to be unlatched and the door 22b opened.

In the event that the secondary door 22b is inadvertently left open, or is closed but not fully latched following the closing of the primary door 22a, the interlock 48 is designed to permit subsequent closing and latching of the secondary door 22b without having first to re-open the primary door 22a. The torsion spring 84 of the latch disabling member 52 is sufficiently rigid to transmit motion between the shaft 58 and latch disabling member 52, yet it is sufficiently resilient to enable the latch disabling member 52 to pivot independently of the movement of the lever arm 56 and shaft 58 between the disabling and enabling positions to accommodate such subsequent closing and latching of the secondary door 22b as necessary. All that is required is that the secondary door 22b be swung closed and the latch mechanism 30 rotated to the latched position. Moving the mechanism 30 to the latched position rotates the tongue 46 into engagement with the camming surface 90 of the bottommost ear portion 86, causing the latch disabling member 52 to deflect initially inwardly in opposition to the spring 84. As the tongue 46 passes the ear 86, it drops into the detent 88, whereupon the latch disabling member 52 is returned by the spring 84 back to the disabling position to trap the tongue 46 in the latched position to prevent subsequent re-opening of the secondary door 22b.

Thus far, the construction and operation of the interlock 48 has been concerned with controlling the opening of just the secondary door 22b located immediately adjacent the primary door 22a. For enclosures 10 having more than one secondary door 22b, as in the case of the illustrated embodiment in which there are two such additional secondary doors 22b, the interlock 48 includes additional latching units 92 coupled to the actuator 50 by the mechanical linkage system 54 to interact in the same manner with the latching mechanisms 30 of such additional secondary doors 22b.

In the illustrated embodiment, the two additional secondary doors 22b are mounted such that their swinging sides are adjacent one another along the third vertical frame portion 18c of the cabinet 12. As such, the respective latch mechanisms 30 are adjacent one another on opposite sides of the frame portion 18c. Conveniently, the latching unit 92 is of a double latch construction having two latch disabling members 94 like those of latch disabling member 52 pivoted in the same manner by hinge pins 96 to opposite sides of a housing 98 like that of housing 64. A similar but shorter shaft 100 is journaled by the housing 98 in the same horizontal orientation as shaft 58. The shaft 100 carries a bracket 101 like that of bracket 81, having an identical leg portion 102 which is coupled at its radially outer free end to each of the latch members 94 by torsion springs 103, like that of torsion spring 84. The latch disabling members 94 each have spaced ear portions 104 identical to those of ears 86 providing detents 106 for accommodation of the tongues 46 of the respective latch mechanisms 30 in the manner described previously.

The double latch unit 92 is coupled to the actuator 50 by the mechanical linkage 54 in such manner that the latch disabling members 94 are caused to move simultaneously with the movement of the latch member 52 between the enabling and disabling positions. For this purpose, the mechanical linkage 54 includes an overhead shaft 108 that extends between the actuator 50 and the double latch unit 92 and is mounted by guides 110 above the doors 22b for rotation relative to the cabinet 12. Connecting rods 114, 116 extend vertically along frame portions 18a and 18c and are connected at their upper ends by brackets 118 to the overhead shaft 108 and are operatively coupled at their opposite lower ends to the shafts 58, 100, respectively.

As shown best in FIGS. 11 and 12, each of the brackets 118 includes a U-shaped member 120, having spaced legs 122, 124, formed with aligned apertures through which the shaft 108 extends. The legs 122, 124 are joined by a bight 126 that carries a set screw 128 which is tightened against the shaft 108 to secure the member 120 for rotation with the shaft 108. Leg 124 mounts a stud 130 in radially outwardly spaced relation to the shaft 108. Secured to the upper end of each connecting rod 114, 116 is an end linkage 132 formed with a bore in which the stud 130 is received to establish a pivotal connection between the linkage 132 and the member 120. A nut 134 retains the end links 132 on their respective studs 130.

The connection between the lower end of the connecting rods 114, 116 and their respective shafts 58, 100 is of similar construction. Referring to FIGS. 3–10, the lower end of each connecting rod 114, 116 is fitted with an end linkage 136 that is identical to linkage 132, and that is coupled in the same manner to a stud 138 projecting laterally from the free end of a leg 140 on a rigid L-shaped linkage 142 projecting from the actuator housing 64, 98. The other leg 144 of the L-shaped linkage 142 is connected by a cross pin 146 to the ends of a pair of laterally spaced arm portions 148 of the brackets 81, 101.

In the operation of the double latch unit 92, closing the primary door 22a displaces the lever arm 56 inwardly as before, causing the actuator shaft 58 to rotate counterclockwise W. The arms 148 swing with the shaft 58 pushing the connecting rod 114 upwardly which in turn rotates the overhead shaft 108 and lifts the other connecting rod 116 upwardly via brackets 118. Upward movement of the connecting rod 116 in turn rotates the shaft 100 of the double latch unit 92, pivoting its latch disabling members 94 into the disabling position in the same manner as latch member 52 to prevent operation of the latch mechanisms 30 of the associated secondary doors 22b.

As the latch disabling members 94 are spring biased by the torsion springs 103 in the same manner as latch disabling member 52, they are able to accommodate, if necessary, the subsequent closing and latching of their associated secondary doors 22b in the event the primary door 22a has been previously closed.

It will be appreciated that additional single or double latch units may be provided as needed to accommodate additional secondary doors 22b. Such additional latch units are operated in the same way by extending the overhead shaft 108 and providing additional connecting rods like those of 116, as required.

The disclosed embodiment is representative of a presently preferred form of the invention, but is intended to be illustrative rather than definitive thereof. The invention is defined in the claims.

I claim:

1. An enclosure for housing electrical equipment comprising:

a cabinet having a primary access door and at least one secondary access door, said doors being hinged to said cabinet and movable between open and closed positions, at least said secondary door having a latch mechanism movable between latched and unlatched positions to secure said secondary door releasably in said closed position when latched, and to permit said secondary door to be opened when unlatched, and a mechanical interlock acting between said primary door and said latch mechanism of said secondary door, said mechanical interlock including an actuator supported adjacent said primary door in position to confront and be displaced by said primary door upon closing said primary door, and a latch disabling member operatively coupled to said actuator and moveable about a pivot axis in response to said displacement of said actuator into a latch disabling position to retain said latch mechanism in said latched position thereby locking said secondary door in said closed position, and being operative in response to opening said primary door to enable movement of said latch mechanism from said latched position to said unlatched position thereby permitting said secondary door to be opened.

2. The enclosure of claim 1 wherein said mechanical interlock includes a mechanical linkage operatively coupling said actuator to said latch disabling member.

3. The enclosure of claim 2 wherein said cabinet includes a plurality of said secondary doors and an associated plurality of said latch mechanisms, said mechanical interlock including a plurality of said latch disabling members operatively coupled by said mechanical linkage to said actuator for conjoint movement into and out of said disabling relation with said latch mechanisms.

4. The enclosure of claim 3 wherein said mechanical linkage includes an overhead shaft supported for rotation by said cabinet above said secondary doors and operatively coupled by a first connecting rod to said actuator in such manner as to cause said shaft to rotate in response to movement of said actuator, and operatively coupled by at least one additional connection rod to at least one of said plurality of said latch disabling members in such manner as to move said latch disabling members conjointly into and out of said disabling relation with said latch mechanism in response to rotation of said overhead shaft.

5. The enclosure of claim 2 wherein said actuator includes a lever arm swingable about a rotation axis and a door-engaging portion spaced from said axis positioned to confront said primary door when closed to rotate said lever arm in a first direction about said axis.

6. The enclosure of claim 5 wherein said mechanical linkage transmits said rotational displacement of said lever arm into pivotal movement of said latch disabling member.

7. The enclosure of claim 5 wherein said pivot axis of said latch disabling member lies transverse to said rotation axis of said lever arm.

8. The enclosure of claim 5 wherein said latch disabling member includes a catch portion engagable with a movable portion of said latch mechanism, when in said disabling relation therewith, to secure said latch mechanism in said latched position.

9. The enclosure of claim 8 wherein said catch portion includes at least one ear projection having a shoulder extendible into confronting engagement with said movable portion when said latch disabling member is pivoted into said disabling relation with said latch mechanism.

10. The enclosure of claim 9 wherein said catch portion comprises a pair of said ear projections spaced to provide a detent therebetween trapping said movable portion against movement with said latch mechanism to said unlatched position when said latch disabling member is pivoted into said disabling relation with said latch mechanism.

11. The enclosure of claim 10 wherein said linkage includes a spring acting on said latch disabling member to urge said latch disabling member constantly toward said disabling relation with said latch mechanism and permitting said latch disabling member to pivot independently of the movement of said actuator.

12. The enclosure of claim 11 wherein said latch disabling member includes a camming surface adjacent said catch positioned to confront and be displaced by said movable member of said latch mechanism when said primary door is closed and, upon movement of said latch mechanism from said unlatched position to said latched position, to accommodate closing and latching of said secondary door subsequent to said closing of said primary door.

* * * * *